United States Patent
Rolfe et al.

(10) Patent No.: US 11,410,067 B2
(45) Date of Patent: Aug. 9, 2022

(54) SYSTEMS AND METHODS FOR MACHINE LEARNING USING ADIABATIC QUANTUM COMPUTERS

(71) Applicant: D-WAVE SYSTEMS INC., Burnaby (CA)

(72) Inventors: Jason Rolfe, Vancouver (CA); Dmytro Korenkevych, Burnaby (CA); Mani Ranjbar, Burnaby (CA); Jack R. Raymond, Vancouver (CA); William G. Macready, West Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 1168 days.

(21) Appl. No.: 15/753,661

(22) PCT Filed: Aug. 18, 2016

(86) PCT No.: PCT/US2016/047628
§ 371 (c)(1),
(2) Date: Feb. 20, 2018

(87) PCT Pub. No.: WO2017/031357
PCT Pub. Date: Feb. 23, 2017

(65) Prior Publication Data
US 2020/0210876 A1    Jul. 2, 2020

Related U.S. Application Data

(60) Provisional application No. 62/307,929, filed on Mar. 14, 2016, provisional application No. 62/268,321, (Continued)

(51) Int. Cl.
*G06N 10/00* (2022.01)
*G06N 20/00* (2019.01)
(Continued)

(52) U.S. Cl.
CPC ............ *G06N 10/00* (2019.01); *G06F 15/80* (2013.01); *G06F 17/18* (2013.01); *G06N 3/08* (2013.01);
(Continued)

(58) Field of Classification Search
None
See application file for complete search history.

(56) References Cited

U.S. PATENT DOCUMENTS 7,135,701 B2    11/2006  Amin et al.
7,418,283 B2    8/2008   Amin
(Continued)

FOREIGN PATENT DOCUMENTS

CN    104050509 A    9/2014
CN    104766167 A    7/2015
(Continued)

OTHER PUBLICATIONS

International Search Report, dated Nov. 22, 2016, for International Application No. PCT/US2016/047628, 3 pages.
(Continued)

*Primary Examiner* — Daniel T Pellett
(74) *Attorney, Agent, or Firm* — Cozen O'Connor

(57) ABSTRACT

A computational system can include digital circuitry and analog circuitry, for instance a digital processor and a quantum processor. The quantum processor can operate as a sample generator providing samples. Samples can be employed by the digital processing in implementing various machine learning techniques. For example, the digital processor can operate as a restricted Boltzmann machine. The computational system can operate as a quantum-based deep belief network operating on a training data-set.

14 Claims, 4 Drawing Sheets

Related U.S. Application Data filed on Dec. 16, 2015, provisional application No. 62/206,974, filed on Aug. 19, 2015, provisional application No. 62/207,057, filed on Aug. 19, 2015.

(51) Int. Cl.

| | |
|---|---|
| *G06N 3/08* | (2006.01) |
| *G06F 15/80* | (2006.01) |
| *G06F 17/18* | (2006.01) |
| *G06N 5/04* | (2006.01) |
| *G06T 1/20* | (2006.01) |

(52) U.S. Cl.
CPC ............ *G06N 5/046* (2013.01); *G06N 20/00* (2019.01); *G06T 1/20* (2013.01)

(56) References Cited

U.S. PATENT DOCUMENTS

| | | | |
|---|---|---|---|
| 7,533,068 | B2 | 5/2009 | Maassen van den Brink et al. |
| 8,008,942 | B2 | 8/2011 | van den Brink et al. |
| 8,190,548 | B2 | 5/2012 | Choi |
| 8,195,596 | B2 | 6/2012 | Rose et al. |
| 8,244,650 | B2 | 8/2012 | Rose |
| 8,421,053 | B2 | 4/2013 | Bunyk et al. |
| 9,727,824 | B2 | 8/2017 | Rose et al. |
| 10,296,846 | B2 | 5/2019 | Csurka et al. |
| 10,318,881 | B2 | 6/2019 | Rose et al. |
| 10,339,466 | B1 | 7/2019 | Ding et al. |
| 2002/0010691 | A1 | 1/2002 | Chen |
| 2008/0132281 | A1 | 6/2008 | Kim et al. |
| 2008/0176750 | A1 | 7/2008 | Rose et al. |
| 2008/0313430 | A1 | 12/2008 | Bunyk |
| 2010/0185422 | A1 | 7/2010 | Hoversten |
| 2010/0228694 | A1* | 9/2010 | Le Roux ................. G06N 3/08 706/25 |
| 2011/0022369 | A1 | 1/2011 | Carroll et al. |
| 2011/0022820 | A1 | 1/2011 | Bunyk et al. |
| 2011/0047201 | A1 | 2/2011 | Macready et al. |
| 2011/0238378 | A1 | 9/2011 | Allen et al. |
| 2012/0215821 | A1 | 8/2012 | Macready et al. |
| 2012/0254586 | A1 | 10/2012 | Amin et al. |
| 2013/0097103 | A1 | 4/2013 | Chari et al. |
| 2014/0025606 | A1 | 1/2014 | Macready |
| 2014/0187427 | A1* | 7/2014 | Macready ................. G06N 5/02 505/170 |
| 2014/0297235 | A1 | 10/2014 | Arora et al. |
| 2015/0006443 | A1 | 1/2015 | Rose et al. |
| 2015/0161524 | A1 | 6/2015 | Hamze |
| 2015/0269124 | A1 | 9/2015 | Hamze et al. |
| 2015/0317558 | A1 | 11/2015 | Adachi et al. |
| 2016/0019459 | A1 | 1/2016 | Audhkhasi et al. |
| 2016/0110657 | A1 | 4/2016 | Gibiansky et al. |
| 2016/0191627 | A1 | 6/2016 | Huang et al. |
| 2018/0018584 | A1 | 1/2018 | Nock et al. |
| 2018/0025291 | A1 | 1/2018 | Dey et al. |
| 2018/0165554 | A1 | 6/2018 | Zhang et al. |
| 2019/0005402 | A1 | 1/2019 | Mohseni et al. |
| 2019/0180147 | A1 | 6/2019 | Zhang et al. |

FOREIGN PATENT DOCUMENTS

| | | |
|---|---|---|
| CN | 104919476 A | 9/2015 |
| CN | 106569601 A | 4/2017 |
| WO | 2009120638 A2 | 10/2009 |
| WO | 2015193531 A1 | 12/2015 |
| WO | 2016/029172 | 2/2016 |
| WO | 2016089711 A1 | 6/2016 |
| WO | 2017124299 A1 | 7/2017 |

OTHER PUBLICATIONS

Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Written Opinion of the International Searching Authority, dated Nov. 22, 2016, for International Application No. PCT/US2016/047628, 8 pages.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Dumoulin, V. et al., "On the Challenges of Physical Implementations of RBMs," Proceedings of the 28th AAAI Conference on Artificial Intelligence, vol. 2, Jul. 27, 2014, 7 pages.
Extended European Search Report for EP Application No. 16837862.8, dated Apr. 3, 2019, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMs with Physical Neural Nets," URL:https://dwave.wordpress.com/2014/01/24 /training-dbms-with-physical-neural-nets/, Jan. 24, 2014, 10 pages.
Chinese Office Action for Application No. CN 2016800606343, dated May 8, 2021, 21 pages (with English translation).
Achille et Soatto, "Information Dropout: Learning Optimal Representations Through Noise" Nov. 4, 2016, ICLR, arXiv: 1611.01353v1, pp. 1-12. (Year: 2016).
Amin, "Effect of Local Minima on Adiabatic Quantum Optimization," Physical Review Letters 100(130503), 2008, 4 pages.
Awasthi et al., "Efficient Learning of Linear Seperators under Bounded Noise" Mar. 12, 2015, arXiv: 1503.03594v1, pp. 1-23. (Year: 2015).
Awasthi et al., "Learning and 1-bit Compressed Sensing under Asymmetric Noise" Jun. 6, 2016, JMLR, pp. 1-41. (Year 2016).
Benedetti et al., "Quantum-assisted learning of graphical models with arbitrary pairwise connectivity" Sep. 8, 2016, arXiv: 1609.02542v1, pp. 1-13. (Year: 2016).
Blanchard et al., "Classification with Asymmetric Label Noise: Consistency and Maximal Denoising" Aug. 5, 2016, arXiv 1303.1208v3, pp. 1-47. (Year: 2016).
Bornschein et al., "Bidirectional Helmholtz Machines" May 25, 2016, arXiv: 1506.03877v5. (Year: 2016).
Brakel, P., Dieleman, S., & Schrauwen. "Training restricted Boltzmann machines with multi-tempering: Harnessing parallelization", 2012.
Chen et al., "Parametric Herding," Proceedings of the 13th International Conference on Artificial Intelligence and Statistics (AISTATS), 2010, pp. 97-104.
Courville, A. et al., "A Spike and Slab Restricted Boltzmann Machine," Proceedings of the 14th International Conference on Artificial Intelligence and Statistics (AISTATS), 2011, 9 pages.
Desjardins, G., Courville, A., Bengio, Y., Vincent, P., & Delalleau, O. "Parallel tempering for training of restricted Boltzmann machines", 2010.
Hinton et al., "A Practical Guide to Training Restricted Boltzmann Machines," Springer, pp. 599-619, Jan. 1, 2012.
Hinton, Geoffrey E. . Training products of experts by minimizing contrastive divergence. Neural Computation, 14:1771-1800, 2002.
Hinton, Geoffrey, Simon Osindero, and Yee-Whye Teh. A fast learning algorithm for deep belief nets. Neural computation, 18(7):1527-1554, 2006.
Jain et al., "Estimating the class prior and posterior from noisy positives and unlabeled data" Jun. 28, 2016, arXiv: 1606.08561v1, pp. 1-19. (Year: 2016).
Jordan, Michael I., Zoubin Ghahramani, Tommi S Jaakkola, and Lawrence K Saul. An introduction to variational methods for graphical models. Machine learning, 37(2):183-233, 1999.
Katzgraber et al., "Glassy Chimeras Could Be Blind to Quantum Speedup: Designing Better Benchmarks for Quantum Annealing Machines," Physical Review X(4):021008, 2014. (8 pages).

(56) References Cited

OTHER PUBLICATIONS

Ke et al., "Variational Convolutional Networks for Human-Centric Annotations" Nov. 20, 2016, pp. 120-135. (Year: 2016).
Korenkevych et al., "Benchmarking Quantum Hardware for Training of Fully Visible Boltzmann Machines" Nov. 14, 2016, arXiv: 1611.04528v1, pp. 1-22. (Year: 2016).
Le, Quoc , Marc' Aurelio Ranzato, Rajat Monga, Matthieu Devin, Greg Corrado, Kai Chen, Jeff Dean, and Andrew Ng. Building high-level features using large scale unsupervised learning. In ICML'2012, 2012.
LeCun, Y., L. Bottou, Y. Bengio, and P. Haffner. Gradient based learning applied to document recognition. Proc. IEEE, 1998.
Liu et Tao, "Classification with Noisy Labels by Importance Reweighting" Mar. 2016, pp. 447-461. (Year: 2016).
Long, Philip M and Rocco Servedio. Restricted boltzmann machines are hard to approximately evaluate or simulate. In Proceedings of the 27th International Conference on Machine Learning (ICML-10), pp. 703-710, 2010.
Menon et al., "Learning from Binary Labels with Instance-Dependent Corruption" May 4, 2016, pp. 1-41. (Year: 2016).
Murray, I. et al., "Bayesian Learning in Undirected Graphical Models: Approximate MCMC Algorithms," UAI '04 Proceedings of the 20th conference on Uncertainty in Artificial Intelligence, 2004, 8 pages.
Neven, H. et al., "QBoost: Large Scale Classifier Training with Adiabatic Quantum Optimization," JMLR: Workshop and Conference Proceedings 25, 2012, 16 pages.
Non-Final Office Action Issued in U.S. Appl. No. 15/822,884 dated Feb. 17, 2022, 45 pages.
Non-Final Office Action Issued in U.S. Appl. No. 16/336,625 dated Feb. 14, 2022, 22 pages.
Omidshafiei et al., "Hierarchical Bayesian Noise Inference for Robust Real-time Probabilistic Object Classification" Jul. 14, 2016, arXiv: 1605.01042v2, pp. 1-9. (Year: 2016).
Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).
Prakash, "Quantum Algorithms for Linear Algebra and Machine Learning," Doctoral Thesis, Technical Report No. UCB/EECS-2014-211, University of California at Berkeley, 2014, pp. 1-9.
Reed et al., "Training Deep Neural Networks on Noisy Labels with Bootstrapping," arXiv:1412.6596v3 [cs.CV] Apr. 15, 2015, 11 pages.
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Somma, R., S Boixo, and H Barnum. Quantum simulated annealing. arXiv preprint arXiv:0712.1008, 2007.
Somma, RD, S Boixo, H Barnum, and E Knill. Quantum simulations of classical annealing processes. Physical review letters, 101(13):130504, 2008.
Tieleman, T., "Training Restricted Boltzmann Machines using Approximation to the Likelihood Gradient," ICML '08: Proceedings of the 25th international conference on Machine learning, 2008, 8 pages.
Tosh, Christopher, "Mixing Rates for the Alternating Gibbs Sampler over Restricted Boltzmann Machines and Friends" Jun. 2016. Year: 2016).
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Wang et al., "Paired Restricted Boltzmann Machine for Linked Data" Oct. 2016. (Year: 2016).

Xu et Ou "Joint Stochastic Approximation Learning of Helmholtz Machines" Mar. 20, 2016, ICLR arXiv: 1603.06170v1, pp. 1-8. (Year: 2016).
"On the Challenges of Physical Implementations of RBMs", arXiv:1312.5258V1 [stat.ML] Dec. 18, 2013, XP-002743443, 9 pages.
B. Sallans and G.E. Hitton , "Reinforcement Learning with Factored States and Actions". JMLR, 5:1063-1088, 2004.
Bian , et al., "The Ising Model: teaching an old problem new tricks", D-wave systems. 2 (year 2010), 32 pages.
Bielza , et al., "Bayesian networks in neuroscience: a survey", Oct. 16, 2014, Frontiers in Computational Neuroscience, vol. 8, Article 131, p. 1-23 (Year: 2014).
Chen , et al., "Stochastic Gradient Hamiltonian Monte Carlo", arXiv: 1402.4102 May 12, 2014. https://arxiv.org/abs/1402.4102.
Cho, K.-H., Raiko, T, & Ilin, A., "Parallel tempering is efficient for learning restricted Boltzmann machines", 2010.
Dumoulin , et al., "On the Challenges of Physical Implementations of RBMs", https://arxiv.org/abs/1312.5258v2, Oct. 28, 2014.
Fischer, A. & Igel, C., "A bound for the convergence rate of parallel tempering for sampling restricted Boltzmann machines", 2015.
Heess, N., et al., "Actor-Critic Reinforcement Learning with Energy-based Policies". JMLR, 24:43-57, 2012.
Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.
Hinton, Geoffrey E, et al., "Reducing the Dimensionality of Data with Neural Networks", Science, wwwsciencemag.org, vol. 313, Jul. 28, 2006, pp. 504-507.
Le Roux, Nicolas , et al., "Representational Power of Restricted Boltzmann Machines and Deep Belief Networks", Dept. IRO, University of Montréal Canada, Technical Report 1294, Apr. 18, 2007, 14 pages.
Lee , et al., "Efficient sparse coding algorithm", NIPS, 2007,pp. 801-808.
Mnih , et al., "Neural variational inference and learning in belief networks". arXiv: 1402.0030 Jun. 4, 2016. https://arxiv.org/abs/1402.0030.
Murphy , "Machine Learning: a probalistic perspective", MIT Press, 2012. http://noiselab.ucsd.edu/ECE228/Murphy_Machine_Learning.pdf.
Neven , et al., "Training a binary classifier with the quantum adiabatic algorithm", arXiv preprint arXivc:0811.0416, 2008, 11 pages.
Rasmus, Antti, et al., "Semi-Supervised Learning with Ladder Networks", arXiv: 1507.02672v2 [cs.NE] Nov. 24, 2015, 19 pages.
Salakhutdinov, R. , "Learning deep Boltzmann machines using adaptive MCMC", 2010.
Salakhutdinov, R. , "Learning in Markov random transitions.elds using tempered", 2009.
Salakhutdinov, R. & Murray, I., "On the quantitative analysis of deep belief networks", 2008.
Smelyanskiy , et al., "A near-term quantum computing approach for hard computational problems in space exploration" arXiv preprint arXir:1204.2821 (year:2012).
Tieleman, T. & Hinton, G., "Using fast weights to improve persistent contrastive divergence", 2009.
Wiebe, Nathan , et al., "Quantum Inspired Training for Boltzmann Machines", arXiv: 1507.02642v1 [cs.LG] Jul. 9, 2015, 18 pages.
Zhang, Yichuan , et al., "Continuous Relaxations for Discrete Hamiltonian Monte Carlo", School of Informatic, University of Edinburgh, Dept of Engineering, University of Cambridge, United Kingdom, 9 pages.

* cited by examiner

SYSTEMS AND METHODS FOR MACHINE LEARNING USING ADIABATIC QUANTUM COMPUTERS

BACKGROUND

Field

The present disclosure generally relates to machine learning.

Machine Learning

Machine learning relates to methods and circuitry that can learn from data and make predictions based on data. In contrast to methods or circuitry that follow static program instructions, machine learning methods and circuitry can include deriving a model from example inputs (such as a training set) and then making data-driven predictions.

Machine learning is related to optimization. Some problems can be expressed in terms of minimizing a loss function on a training set, where the loss function describes the disparity between the predictions of the model being trained and observable data.

Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Machine learning can be used in situations where explicit approaches are considered infeasible. Example application areas include optical character recognition, search engine optimization, and computer vision.

Quantum Processor

A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f \quad (1)$$

where $H_i$ is the initial Hamiltonian, $H_f$ is the final Hamiltonian, $H_e$ is the evolution or instantaneous Hamiltonian, and s is an evolution coefficient which controls the rate of evolution (i.e., the rate at which the Hamiltonian changes).

As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. As used herein an "adiabatic" evolution is an evolution that satisfies the adiabatic condition:

$$\dot{s}|\langle 1|dH_e/ds|0\rangle| = \delta g^2(s) \quad (2)$$

where $\dot{s}$ is the time derivative of s, g(s) is the difference in energy between the ground state and first excited state of the system (also referred to herein as the "gap size") as a function of s, and $\delta$ is a coefficient much less than 1.

If the evolution is slow enough that the system is always in the instantaneous ground state of the evolution Hamiltonian, then transitions at anti-crossings (when the gap size is smallest) are avoided. Other evolution schedules, besides the linear evolution described above, are possible including non-linear evolution, parametric evolution, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. While classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present to annealing. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P, \quad (3)$$

where A(t) and B(t) are time dependent envelope functions. For example, A(t) can change from a large value to substantially zero during the evolution and $H_E$ can be thought of as an evolution Hamiltonian similar to $H_e$ described in the context of adiabatic quantum computation above. The disorder is slowly removed by removing $H_D$ (i.e., by reducing A(t)).

Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF SUMMARY

A method of operation in a system, the system including at least one digital circuit and at least one analog circuit, may be summarized as including retrieving a plurality of samples generated by the at least one analog circuit; performing machine learning by the digital circuit using at least one of the samples generated by the at least one analog circuit to reduce a total number of recursive machine learning iterations performed by the digital circuit to determine a result with a defined level of accuracy as compared to performing the machine learning by the digital circuit without use of the at least one sample from the at least one analog circuit. Performing machine learning by the digital circuit may include performing machine learning via a restricted Boltzmann machine (RBM). The at least one analog circuit may include at least one quantum processor, the at least one digital circuit may include a plurality of graphical processing units (GPUs), and performing machine learning by the digital circuit may include operating the GPUs in a feed-forward neural network.

The method may further include natively performing RBM sampling via the at least one quantum processor to generated the plurality of samples.

The method may further include operating the at least one quantum processor as a sample generator to provide the plurality of samples from a probability distribution, wherein a shape of the probability distribution may depend on a configuration of a number of programmable parameters for the analog processor, and wherein operating the at least one quantum processor as a sample generator may include programming the at least one quantum processor with a configuration of the number of programmable parameters for the at least one quantum processor, wherein the configuration of a number of programmable parameters corresponds to the probability distribution over the plurality of qubits of the at least one quantum processor, evolving the at least one quantum processor, and reading out states for the qubits in plurality of qubits of the at least one quantum processor, wherein the states for the qubits in the plurality of qubits correspond to a sample from the probability distribution; updating the plurality of samples to include the sample from the probability distribution; and returning the set of samples.

A system may be summarized as including at least one digital circuit; and at least one analog circuit, wherein the at least one digital circuit and the at least one analog circuit execute any of the methods.

A method of operation in a system, the system including at least one digital circuit and at least one analog circuit, may be summarized as including receiving a problem having associated therewith a number of problem values; performing machine learning to generate a mapping between the number of problem values associated with the problem and a number of qubits associated with the at least one analog circuit. Performing machine learning to generate a mapping between the number of problem values and a number of qubits may include performing machine learning by the at least one digital circuit. Performing machine learning to generate a mapping between the number of problem values and a number of qubits may include performing machine learning to generate a mapping between a plurality of input values and a plurality of qubits. Performing machine learning to generate a mapping between the number of problem values and a number of qubits may include performing machine learning to generate a mapping between a plurality of output values and a plurality of qubits. Performing machine learning to generate a mapping between the number of problem values and a number of qubits may include performing machine learning to generate a mapping between a plurality of output values and a plurality of qubits. Performing machine learning to generate a mapping between the number of problem values and a number of qubits may include performing machine learning to generate a number of lateral connections between at least one of branches or leaves in a tree representation of the problem.

A system may be summarized as including at least one digital circuit; and at least one analog circuit, wherein the at least one digital circuit and the at least one analog circuit execute any of the methods.

A method for training a quantum deep belief network by a computational system, the computational system including at least one processor, may be summarized as including receiving a training dataset; defining a model by the at least one processor, the model comprising one or more model parameters; initializing the model parameters with random values; testing to determine if a stopping criterion is met; in response to determining the stopping criterion is not met, the method further comprising iteratively for i from 1 to until a stopping condition is reached: fetching an $i^{th}$ mini-batch of data from the training dataset; drawing samples from an approximating posterior distribution; drawing samples from the prior distribution; estimating a gradient of a log-likelihood distribution with respect to the model parameters; updating the model parameters based at least in part on an estimated lower bound; determining if the $i^{th}$ mini-batch is a last mini-batch; in response to determining the $i^{th}$ mini-batch is not the last mini-batch, incrementing i and performing another iteration. Drawing samples from the approximating posterior distribution may include drawing samples from the approximating posterior using a non-quantum processor. Drawing samples from the prior distribution may include drawing samples from the prior distribution using a quantum processor.

Drawing samples from the prior distribution may include drawing samples from the prior distribution using a quantum processor including: operating the at least one quantum processor as a sample generator to provide the plurality of samples from a probability distribution, wherein a shape of the probability distribution depends on a configuration of a number of programmable parameters for the analog processor, and wherein operating the at least one quantum processor as a sample generator includes: programming the at least one quantum processor with a configuration of the number of programmable parameters for the at least one quantum processor, wherein the configuration of a number of programmable parameters corresponds to the probability distribution over the plurality of qubits of the at least one quantum processor, evolving the at least one quantum processor, and reading out states for the qubits in plurality of qubits of the at least one quantum processor, wherein the states for the qubits in the plurality of qubits correspond to a sample from the probability distribution; updating the plurality of samples to include the sample from the probability distribution; and returning the set of samples.

A computational system may be summarized as including at least one processor; and at least one nontransitory processor-readable storage medium that stores at least one of processor-executable instructions or data which, when executed by the at least one processor cause the at least processor to execute any of the methods.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Generalities

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Quantum Hardware

Figure 1:
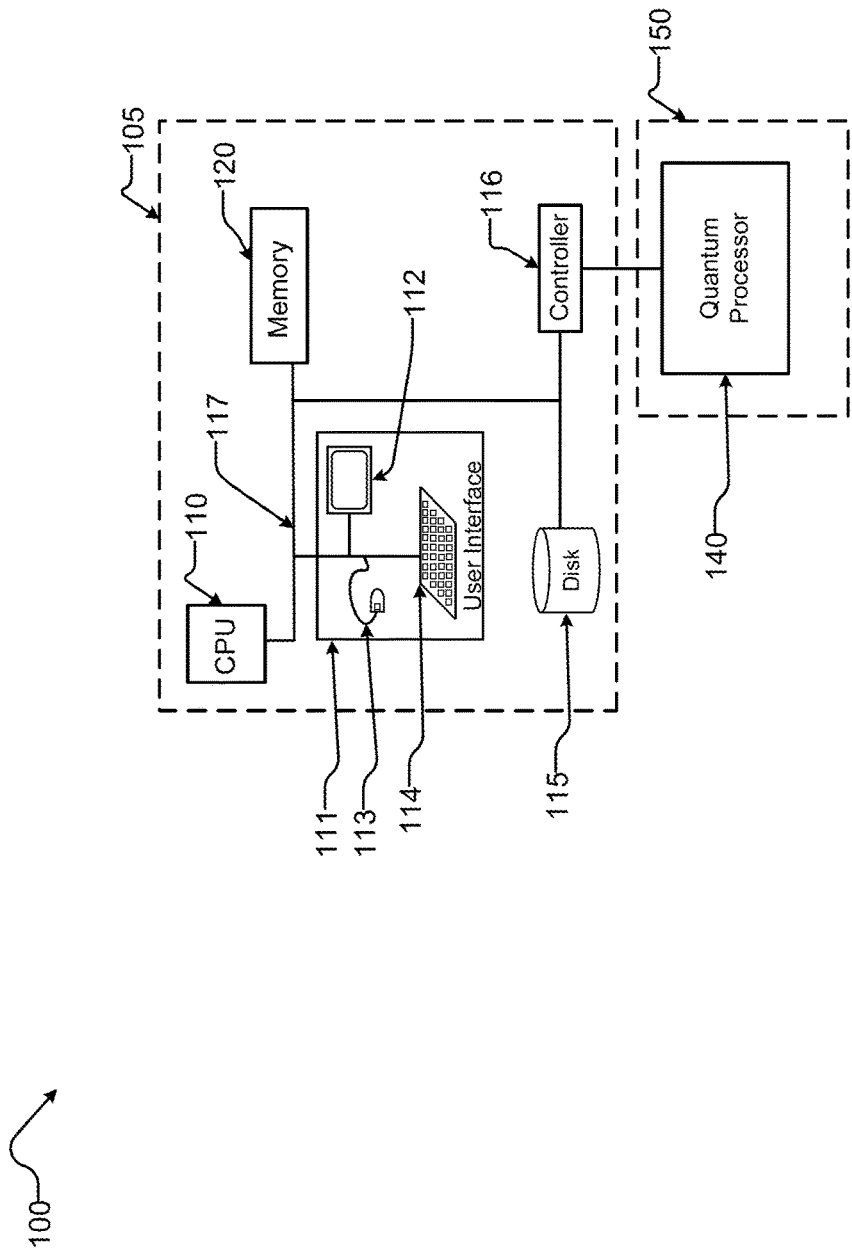
FIG. 1 is a schematic diagram that illustrates an exemplary hybrid computer including a digital computer and an analog computer in accordance with the present systems, devices, methods, and articles.

FIG. 1 illustrates a hybrid computing system 100 including a digital computer 105 coupled to an analog computer 150. In some implementations analog computer 150 is a quantum processor. The exemplary digital computer 105 includes a digital processor (CPU) 110 that may be used to perform classical digital processing tasks.

Digital computer 105 may include at least one digital processor (such as central processor unit 110 with one or more cores), at least one system memory 120, and at least one system bus 117 that couples various system components, including system memory 120 to central processor unit 110.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

Unless described otherwise, the construction and operation of the various blocks shown in FIG. 1 are of conventional design. As a result, such blocks need not be described in further detail herein, as they will be understood by those skilled in the relevant art.

Digital computer 105 may include a user input/output subsystem 111. In some implementations, the user input/output subsystem includes one or more user input/output components such as a display 112, mouse 113, and/or keyboard 114.

System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown).

Digital computer 105 may also include other non-transitory computer- or processor-readable storage media or non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for processor- or computer-readable instructions, data structures, or other data (sometimes called program modules) for digital computer 105.

Although digital computer 105 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 120. For example, system memory 120 may store instruction for communicating with remote clients and scheduling use of resources including resources on the digital computer 105 and analog computer 150. Also for example, system memory 120 may store at least one of processor executable instructions or data that, when executed by at least one processor, causes the at least one processor to execute the various algorithms described elsewhere herein, including machine learning related algorithms.

In some implementations system memory 120 may store processor- or computer-readable calculation instructions to perform pre-processing, co-processing, and post-processing to analog computer 150. System memory 120 may store at set of analog computer interface instructions to interact with analog computer 150.

Analog computer 150 may include at least one analog processor such as quantum processor 140. Analog computer 150 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cyrogentically cool the analog processor, for example to temperature below approximately 1° Kelvin.

Figure 2A:
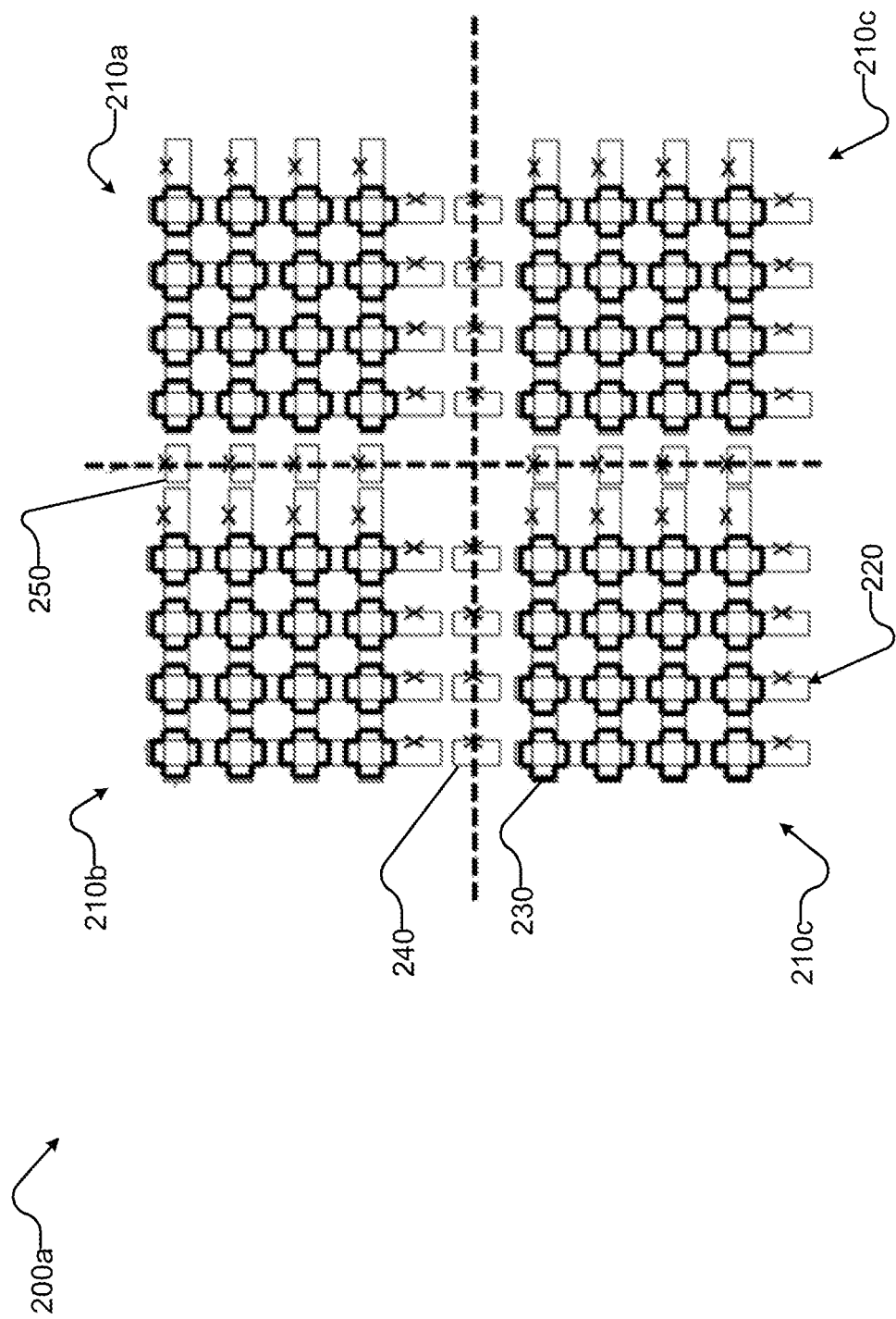
FIG. 2A is a schematic diagram of an exemplary topology for a quantum processor, in accordance with the presently described systems, devices, articles, and methods.

FIG. 2A shows an exemplary topology 200a for a quantum processor, in accordance with the presently described systems, devices, articles, and methods. Topology 200a may be used to implement quantum processor 140 of FIG. 1, however other topologies can also be used for the systems and methods of the present disclosure. Topology 200a comprises a grid of 2×2 cells such as cells 210a, 210b, 210c and 210d, each cell comprised of 8 qubits such as qubit 220 (only one called out in FIG. 2A).

Within each cell 210a-210d, there are eight qubits 220 (only one called out in FIG. 1A), the qubits 220 in each cell 210a-210d arranged four rows (extending horizontally in drawing sheet) and four columns (extending vertically in drawing sheet). Pairs of qubits 220 from the rows and columns can be communicatively coupled to one another by a respective coupler such as coupler 230 (illustrated by bold cross shapes, only one called out in FIG. 2A). A respective coupler 230 is positioned and operable to communicatively couple the qubit in each column (vertically-oriented qubit in drawing sheet) in each cell to the qubits in each row (horizontally-oriented qubit in drawing sheet) in the same cell. Additionally, a respective coupler, such as coupler 240 (only one called out in FIG. 2A), is positioned and operable to communicatively couple the qubit in each column (vertically-oriented qubit in drawing sheet) in each cell with a corresponding qubit in each column (vertically-oriented qubit in drawing sheet) in a nearest neighboring cell in a same direction as the orientation of the columns. Similarly, a respective coupler, such as coupler 250 (only one called out in FIG. 2A), is positioned and operable to communicatively couple the qubit in each row (horizontally-oriented qubit in drawing sheet) in each cell with a corresponding qubit in each row (horizontally-oriented qubit in drawing sheet) in each nearest neighboring cell in a same direction as the orientation of the rows.

Figure 2B:
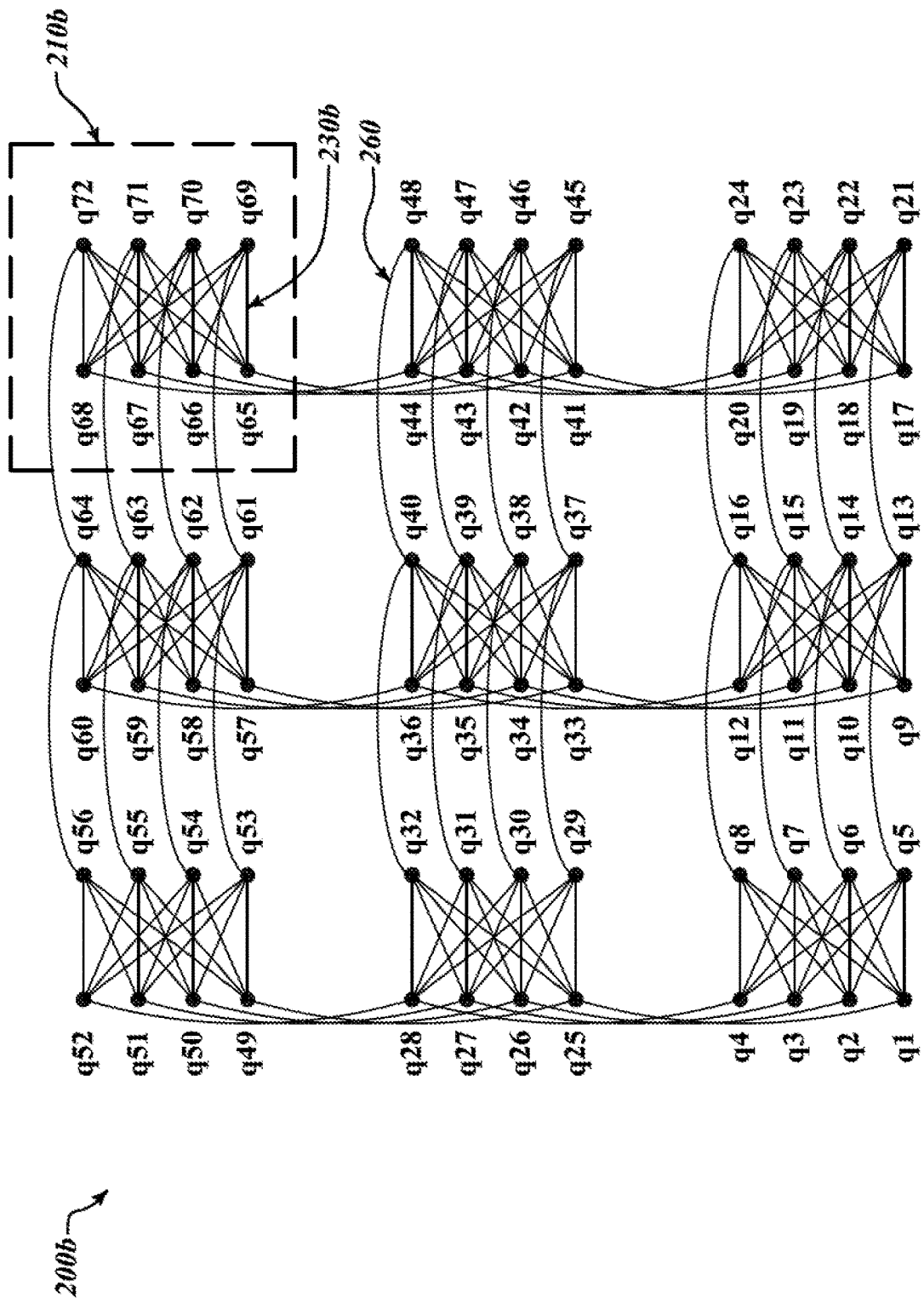
FIG. 2B is a schematic diagram of an exemplary topology for a quantum processor with nine cells of qubits, in accordance with the presently described systems, devices, articles, and methods.

FIG. 2B is a schematic diagram illustrating an exemplary topology 200b for a quantum processor, such as quantum processor 140 of FIG. 1, in accordance with the presently described systems, devices, articles, and methods. Topology 200b shows nine cells, such as cell 210b (only one called out in FIG. 2B), each cell comprising eight qubits q1 through q72. FIG. 2B illustrates the intra-coupling, such as coupler 230b (only one called out in FIG. 2B), and inter-coupling, such as coupler 260 (only one called out in FIG. 2B), for the cells 210b.

The non-planarity of the connections between qubits q1-q72 makes the problem of finding the lowest energy state of the qubits q1-q72 an NP-hard problem, which means that it is possible to map many practical problems to the topology illustrated in FIGS. 2A and 2B, and described above.

Use of the quantum processor 140, with the topology illustrated in FIGS. 2A and 2B is not limited only to problems that fit the native topology. For example, it is possible to embed a complete graph of size N on a quantum processor of size $O(N^2)$ by chaining qubits together.

A computational system 100 (FIG. 1) comprising a quantum processor 140 having topology 200a of FIG. 2A can specify an energy function over spin variables +1/−1, and receive from the quantum processor samples of lower-energy spin configurations in an approximately Boltzmann distribution according to the Ising model as follows:

$$E(s) = \sum_i h_i s_i + \sum_{i,j} J_{i,j} s_i s_j$$

where $h_i$ are local biases and $J_{i,j}$ are coupling terms.

The spin variables can be mapped to binary variables 0/1. Higher-order energy functions can be expressed by introducing additional constraints over auxiliary variables.

Machine Learning

Various systems and methods for replacing or augmenting conventional (i.e., classical) machine learning hardware such as Graphics Processing Units (GPUs) and Central Processing Units (CPUs) with quantum hardware are described herein. Quantum hardware typically includes one or more quantum processors or quantum processing units (QPUs). The systems and methods described herein adapt machine learning architectures and methods to exploit QPUs to advantageously achieve improved machine performance. Improved machine performance typically includes reduced training time and/or increased generalization accuracy.

Optimization and sampling can be computational bottlenecks in machine learning systems and methods. The systems and methods described herein integrate the QPU into the machine learning pipeline (including the architecture and methods) to perform optimization and/or sampling with improved performance over classical hardware. The machine learning pipeline can be modified to suit QPUs that can be realized in practice.

Sampling in Training Probabilistic Models

Boltzmann machines, including restricted Boltzmann machines (RBMs), can be used in deep learning systems. Boltzmann machines are particularly suitable for unsupervised learning, and probabilistic modeling such as in-painting and classification.

A shortcoming of existing approaches to deep learning is that Boltzmann machines typically use costly Markov Chain Monte Carlo (MCMC) techniques to approximate samples drawn from an empirical distribution. The existing approaches serve as a proxy for a physical Boltzmann sampler.

This application describes integration of a QPU into machine learning systems, and methods to reduce the time taken to perform training. For example, the QPU can be used as a physical Boltzmann sampler. The approach involves programming the QPU (which is an Ising system) such that the spin configurations realize a user-defined Boltzmann distribution natively. The approach can then draw samples directly from the QPU.

Restricted Boltzmann Machine (RBM)

The restricted Boltzmann machine (RBM) is a probabilistic graphical model that represents a joint probability distribution $p(x,z)$ over binary visible units x and binary hidden units z. The restricted Boltzmann machine can be used as an element in a deep learning network.

The RBM network has the topology of a bipartite graph with biases on each visible unit and on each hidden unit, and weights (couplings) on each edge. An energy $E(x,z)$ can be associated with the joint probability distribution $p(x,z)$ over the visible and the hidden units, as follows:

$$p(x,z)=e^{-E(x,z)}/Z$$

where Z is the partition function.

For a restricted Boltzmann machine, the energy is:

$$E(x,z)=-b^T \cdot x - c^T \cdot z - z^T \cdot W \cdot x$$

where b and c are bias terms expressed as matrices, W is a coupling term expressed as a matrix, and T denotes the transpose of a matrix. The conditional probabilities can be computed as follows:

$$p(x|z)=\sigma(b+W^T \cdot z)$$

$$p(z|x)=\sigma(c+W^T \cdot x)$$

where σ is the sigmoid function, used to ensure the values of the conditional probabilities lie in the range [0,1].

Training RBMs

Training is the process by which the parameters of the model are adjusted to favor producing the desired training distribution. Typically, this is done by attempting to maximize the observed data distribution with respect to the model parameters. One part of the process involves sampling over the given data distribution, and this part is generally straightforward. Another part of the process involves sampling over the predicted model distribution, and this is generally intractable, in the sense that it would use unmanageable amounts of computational resources.

Some existing approaches use a Markov Chain Monte Carlo (MCMC) method to perform sampling. MCMC constructs a Markov chain that has the desired distribution as its equilibrium distribution. The state of the chain after $k \gg 1$ steps is used as a sample of the desired distribution. The quality of the sample improves as a function of the number of steps k which means that MCMC makes training a slow process.

To speed up the MCMC process, Contrastive Divergence-k (CD-k) can be used, in which the method takes only k steps of the MCMC process. Another way to speed up the process is to use Persistent Contrastive Divergence (PCD), in which a Markov Chain is initialized in the final state from the previous model. CD-k and PCD methods tend to perform poorly when the distribution is (i) multi-modal, and (ii) the modes are separated by regions of low probability.

Even approximate sampling is NP-hard. The cost of sampling can grow exponentially with problem size. Samples drawn from a native QPU network (as described above) are typically close to a Boltzmann distribution. It is possible to quantify the rate of convergence to a true Boltzmann distribution by evaluating the KL-divergence between the empirical distribution and the true distribution as a function of the number of samples.

Noise can limit the precision with which the parameters of the model can be set in the quantum hardware. In practice, this means that the QPU is sampling from a slightly different energy function. The effects can be mitigated by sampling from the QPU and using the samples as starting points for non-quantum post-processing, e.g., to initialize MCMC, CD, and/or PCD. Some suitable post-processing techniques can include those described in International Patent Publication No. WO2016029172A1.

In the approach described in the preceding paragraph, the QPU is performing the hard part of the sampling process. The QPU finds a diverse set of valleys, and the post-processing operation samples within the valleys. Post-processing can be implemented in a GPU, and can be at least partially overlapped with sampling in the quantum processor to reduce the impact of post-processing on the overall timing.

Sampling to Train RBMs

A training data set can comprise a set of visible vectors. Training comprises adjusting the model parameters such that the model is most likely to reproduce the distribution of the training set. Typically, training comprises maximizing the log-likelihood of the observed data distribution with respect to the model parameters θ:

$$\frac{\partial \log(\Sigma_z p(x,z))}{\partial \theta} = -\left\langle \frac{\partial E(x,z)}{\partial \theta} \right\rangle_{p(z|x)} + \left\langle \frac{\partial E(x,z)}{\partial \theta} \right\rangle_{p(x|z)}$$

The first term on the right-hand side (RHS) in the above equation is related to the positive phase, and computes an expected value of energy E over $p(z|x)$. The term involves sampling over the given data distribution.

The second term on the RHS is related to the negative phase, and computes an expected value of energy E, over p(x|z). The term involves sampling over the predicted model distribution.

Fully Visible RBM

In one approach to using a quantum processor to facilitate machine learning, datasets that are sampled from distributions of the form:

$$p(x,z) = e^{-E(x,z)}/Z$$

can be analyzed to infer the original parameters used to generate the datasets. A distribution of this form can be understood as a stand-in for the ideal prior distribution over the hidden units, where all connections to the visible units have been abstracted away. The ability of the system to learn the optimal prior distribution, when it is provided explicitly, is a necessary condition for the prior distribution to be learnable in conjunction with the mapping between the hidden and the visible units, when maximizing the expected log-likelihood of a dataset. The problem is analogous to training a conditional random field in which the conditional distribution of the random variables given the observations matches the topology of the quantum processor, and the observation is held fixed.

In attempting to reconstruct the original parameters of a distribution compatible with the quantum processor, all of the random variables are observable, and the problem corresponds to training a fully visible Boltzmann machine. While the log-likelihood of fully visible Boltzmann machines is convex in their parameters, training them is still hard. In particular, computing the gradient of the log-likelihood can require the first- and second-order statistics of the current model, which are NP-hard to estimate.

Sampling from the posterior distribution in a traditional RBM, in which one side of the bipartite split is hidden, can be straightforward and typically exact. Fully observed datasets break all symmetries regarding the use of the hidden units, but once a particular local minimum is selected, training a traditional RBM may not be significantly harder than training a fully visible Boltzmann machine.

After choosing the parameters of the distribution as described above, training, validation, and test datasets can be constructed. Training can be performed, for example, using a stochastic gradient ascent method on the expected log-likelihood.

For the topologies illustrated in FIGS. 1B and 1C, each random variable can be connected to four other variables within the same cell, and two variables in adjacent cells. By selecting a distribution constructed, for example, by drawing intra-cell connections uniformly from $\{-2, +2\}$ and drawing inter-cell connections uniformly from $\{-6, +6\}$, the magnitude of connections within cells, and between cells, can be balanced, and long-range correlations of interest can be facilitated.

RBM Sampling Using Quantum Hardware

As described above, quantum hardware (such as a quantum processor having topology 200a of FIG. 2A) can be used to perform RBM sampling natively. A quantum process can use quantum annealing to sample from a sparsely connected RBM, for example. In addition to being used directly as a RBM, a quantum processor can be used in approaches to machine learning based on probabilistic models with sparse lateral connectivity among the hidden units, maintaining dense connectivity between hidden and visible units. In the following paragraphs, systems and methods are described for leveraging AQC in modified deep belief networks and variational auto-encoders.

Quantum Deep Belief Network (qDBN)

To counter possible limitations in the connectivity of qubits in a quantum processor, it can be desirable to transform the input so that it conforms to the class of distributions that can be natively represented by the quantum hardware.

One method is to stack a sparsely-connected RBM on top of a fully-connected RBM, using the fully-connected RBM to capture aspects of the distribution that cannot be represented in the sparsely-connected RBM.

Sampling from the joint distribution of the two-layer Boltzmann machine cannot readily be accelerated by the quantum hardware. So one approach is to use a linear transformation, such as a principal components analysis (PCA), to construct features on which other machine learning methods can operate. For example, a linear transformation can be performed to convert the input into a form amenable to processing on the quantum hardware. Since the statistics of the sparsely-connected quantum hardware are complex, it can be difficult to find a closed-form for the optimal linear transformation that will render the distribution of the data consistent with the class of distributions representable by the quantum hardware. It is desirable that the transformation can be learned.

One method attaches a graphical model to the bottom of the RBM. A PCA is an example of a directed graphical model with (i) a Gaussian conditional input distribution, and (ii) a Gaussian prior probability distribution on the latent variables. The method samples the joint distribution.

The model constructed according to the description above is called a quantum deep belief network (qDBN). The model uses Gaussian visible units, and allows projections from all units in the RBM at the top of the model. It has no hidden layers aside from the RBM. In these respects, the qDBN differs from a conventional deep belief network (DBN).

Since the partition function of the conditional Gaussian is independent of the hidden variables on which it is conditioned, the joint distribution takes the form of an undirected graphical model with quadratic features. This property allows the approach to maintain a strong parallel with the fully visible models described above.

Training qDBNs

The method includes training the model by performing gradient descent on the expected log-likelihood, where the sum is taken over a dataset that approximates samples from the desired empirical distribution. The quantum hardware generates the samples. With a suitable choice of parameters, the method includes drawing a sample from an RBM compatible with the quantum hardware, independent of input, and then sample from the conditional Gaussian.

The prior distribution function need not be compatible with the of the quantum hardware. The conditional distribution of hidden units z given the input x is:

$$E_{z|x}(x, z) = -z^T \left( W - \frac{U^T U}{2 \cdot e^{2\alpha}} \right) z - \left[ b^T + \frac{(x-\mu)^T U}{e^{2\alpha}} \right] \cdot z$$

If the method includes applying a constraint $U^T U = I_p$ (where there are p hidden variables) such that U does not induce coupling between hidden variables, or at least that there is no coupling between hidden variables beyond that imposed by the connectivity of W, the conditional distribution p(z|x) can be made compatible with the quantum hardware.

Training of the qDBN can proceed in a similar manner to that for fully visible models, such as those described earlier.

One difference is that the training method can also include computing the expected gradient due to the conditional distribution of the hidden units in the positive phase. The training method can additionally include drawing new samples, using the equation above, rather than using the fixed set of samples of the dataset for the positive phase. For timing reasons, it can be beneficial to draw the new samples classically, rather than using quantum hardware.

An example of an efficient way to use the Markov chain to generate the new samples, using the equation above, is to initialize each chain assuming that W=0, and then perform Gibbs sampling.

Example Implementations of Training Methods

Algorithm 1 is an exemplary pseudocode showing a method for training a quantum deep belief network, in accordance with the presently described systems, devices, articles, and methods. Algorithm 1 is an example implementation of method 300 of FIG. 3. Algorithm 1 establish the input and output, and initialize the model parameters. Algorithm 1 then tests to determine if a stopping criterion has been met. While the stopping criterion has not been met, algorithm 1 proceeds to define the processing of each mini-batch or subset.

---

Algorithm 1: Train generic qDBN

--- def trainQDBN ( )
| Input : A data set X, where X [:, i] is the ith element, and a learning rate
| parameter e
| Output: Model parameters: $\theta = \{U, \mu, W, b, \alpha\}$
| Initialize model parameters with random values
| while Stopping criteria is not met do
| | foreach minibatch $X_{pos}$ = getMinibatch (X, m) of the training dataset
do
| | | Draw m samples from the (approximate) posterior $Z_{pos} \leftarrow$ posSamples
| | | $(X_{pos})$
| | | Draw m samples from the prior $X_{neg}, Z_{neg} \leftarrow$ negSamples $(Z_{neg}^{prev})$

| | | Estimate $\dfrac{\partial C}{\partial \theta}$ using $calcGradients(X_{pos}, Z_{pos}, X_{neg}, Z_{neg})$

| | | A consistent set of samples must be used to calculate all components
| | | nents

| | | Update parameters according to $\theta^{t+1} \leftarrow \theta^t + \varepsilon \cdot \dfrac{\partial \mathcal{L}}{\partial \theta}$

| | | Project parameters back to the allowed domain using projectParameters ( )
| | end
| end

---

Figure 3:
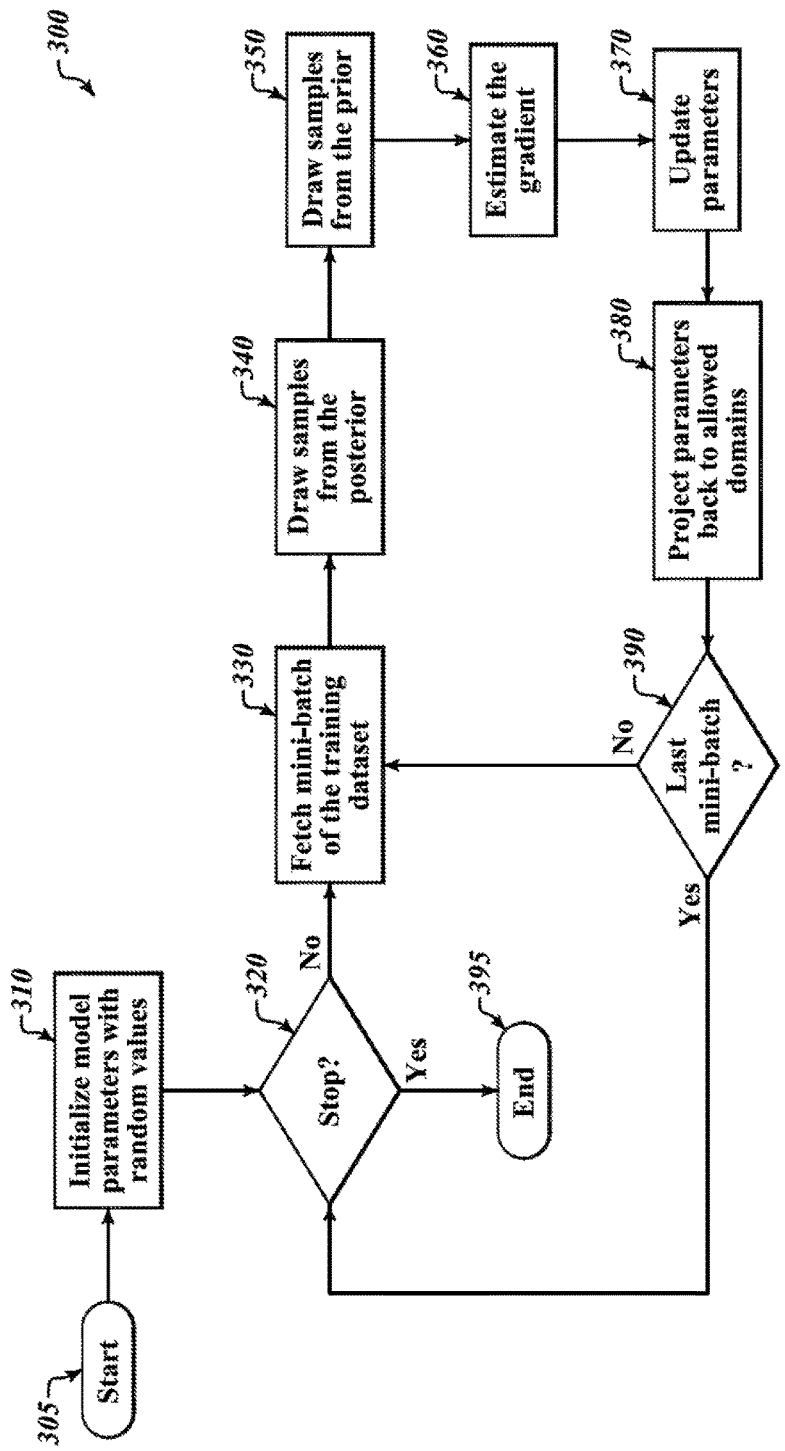
FIG. 3 is a flow chart illustrating an example method for training a generic quantum deep belief network, in accordance with the presently described systems, devices, articles, and methods.

FIG. 3 shows an exemplary method 300 for training a generic quantum deep belief network, in accordance with the presently described systems, devices, articles, and methods.

Execution of method 300 by one or more processor-based devices may occur in accordance with the present system, devices, articles, and methods. Method 300, like other methods described herein, may be implemented by a series or set of processor-readable instructions executed by one or more processors (i.e., hardware circuitry).

The method 300 starts at 305, for example in response to a call from another routine or other invocation.

At 310, the system initializes the model parameters with random values. Alternatively, the system can initialize the model parameters based on a pre-training procedure. At 320, the system tests to determine if a stopping criterion has been reached. The stopping criterion can, for example, be related to the number of epochs (i.e., passes through the dataset) or a measurement of performance between successive passes through a validation dataset. In the latter case, when performance beings to degrade, it can be an indication that the system is over-fitting and should stop.

In response to determining the stopping criterion has been reached, the system ends method 300 at 395, until invoked again, for example, a request to repeat the learning.

In response to determining the stopping criterion has not been reached, the system, fetches a mini-batch (or subset) of the training data set at 330. In particular, the training dataset is decomposed into a number of subsets, each one called a mini-batch. The system keeps a record or a count of which subsets or mini-batches the system has processed. When the system tests to determine whether the current subset or mini-batch is the last one to process, the system can compare a record or a count to the total number of subsets or mini-batches into which the training dataset was decomposed or to the number that were intended for processing.

At 340, the system draws samples from the approximating posterior. At 350, the system draws samples from the prior distribution. At 360, the system estimates the gradient, and at 370 the system updates the model parameters based at least in part on the gradient. At 380, the system project the parameters back to the allowed domain.

At 390, the system tests to determine if the current mini-batch is the last mini-batch to be processed. In response to determining that the current mini-batch is the last mini-batch to be processed, the system returns control to 320. In response to determining that the current mini-batch is not the last mini-batch to be processed, the system returns control to 330.

Algorithm 2 is an exemplary pseudocode showing methods that can be used in conjunction with algorithm 1 for training a quantum deep belief network comprising a fully visible sparsely-connected restricted Boltzmann machine, in accordance with the presently described systems, devices, articles, and methods.

---

Algorithm 2: Helper functions for fully visible RBMs

--- def getMinibatch (X, m)    /* elements of minibatch are unique */
| k ← k + 1
| $X_{pos} \leftarrow X[:, k \cdot m : (k + 1) \cdot m]$
def posSamples $(X_{pos})$    /* vis vars identical to hidden vars */
| $Z_{pos} \leftarrow X_{pos}$
| $X_{pos} \leftarrow \emptyset$
def negSamples $(Z_{pos})$        /* sample from dist of eq 1 */
| if using CD then
| | $Z_{neg} \leftarrow Z_{pos}$
| else if using PCD then
| | $Z_{neg}$ initialized to result of last call to negSamples ( )
| end
| for i ← 1 : n do

| Algorithm 2: Helper functions for fully visible RBMs |
| --- |
| $\|\ \|$ sample "left" half from $p\left(Z_{neg}\left[1:\frac{d}{2},:\right]=1\right) = \text{logistic}\left(W \cdot Z_{neg}\left[\frac{d}{2}:,:\right] + b\left[1:\frac{d}{2}\right]\right)$ <br><br> $\|\ \|$ sample "right" half from $p\left(Z_{neg}\left[\frac{d}{2}:,:\right]=1\right) = \text{logistic}\left(W^T \cdot Z_{neg}\left[1:\frac{d}{2},:\right] + b\left[\frac{d}{2}:\right]\right)$ <br><br> \| end <br> \| $X_{neg} \leftarrow \emptyset$ <br> def calcGradients ($X_{pos}$, $Z_{pos}$, $X_{neg}$, $Z_{neg}$)    /\* grads from eq 2 \*/ <br><br> $\|\ \frac{\partial \mathcal{L}}{\partial W} \leftarrow Z_{pos} \cdot Z_{pos}^T - Z_{neg} \cdot Z_{neg}^T$ <br><br> $\|\ \frac{\partial \mathcal{L}}{\partial b} \leftarrow (Z_{pos} - Z_{neg}) \cdot 1$ <br><br> def projectParameters ( ) <br> \| Parameters are unconstrained |

Algorithm 2 comprises a helper function for fetching a mini-batch of samples. A mini-batch is a subset of the training dataset. In addition, algorithm 2 comprises a helper function to sample in the positive phase (see above) and a helper function to sample in the negative phase. Algorithm 2 comprises a helper function to compute the gradients and a helper function to project the parameters. In this example, the parameters are unconstrained.

Algorithm 3 is an exemplary pseudocode describing an example implementation of a training procedure for a qDBN. In the example illustrated in algorithm 3, the qDBN has orthogonal U.

| Algorithm 3: helper functions for nDBN with orthogonal U |
| --- |
| def getMinibatch (X, m)    /\* elements of minibatch are unique \*/ <br> \| k ← k + 1 <br> \| $X_{pos} \leftarrow X$ [:, k · m : (k + 1) · m] <br> def sampleGeneric ($Z_{prev}$, $W_g$, $b_g$)    /\* sample from specified dist \*/ <br> \| if using CD then <br> \| \| p(Z = 1) ← logistic ($b_g$)    /\* assumes W = 0 for init \*/ <br> \| else if using PCD then <br> \| \| Z initialized to result of last call to $Z_{prev}$ <br> \| end <br> \| for i ← 1 : n do <br><br> $\|\ \|$ sample "left" half from $p\left(Z\left[1:\frac{d}{2},:\right]=1\right) = \text{logistic}\left(W_g \cdot Z\left[\frac{d}{2}:,:\right] + b_g\left[1:\frac{d}{2}\right]\right)$ <br><br> $\|\ \|$ sample "right" half from $p\left(Z\left[\frac{d}{2}:,:\right]=1\right) = \text{logistic}\left(W_g^T \cdot Z\left[1:\frac{d}{2},:\right] + b_g\left[\frac{d}{2}:\right]\right)$ <br><br> \| end <br> \| $X_{neg} \leftarrow \emptyset$ <br> \| return Z <br> def posSamples ($X_{pos}$)    /\* sample from dist of eq 7 \*/ <br><br> $\|\ \beta \leftarrow b + \frac{e^{-2\alpha}}{2} \cdot [2U^T(x-\mu) - 1]$ <br><br> \| $Z_{pos}$ ← sampleGeneric ($Z_{pos}$, W, β)    /\* use CD for init \*/ <br> def negSamples ($Z_{prev}$)    /\* sample from dist of eq 1 \*/ <br> \| $Z_{neg}$ ← sampleGeneric ($Z_{neg}$, W, b) <br> def. calcGradients ($X_{pos}$, $Z_{pos}$, $X_{neg}$, $Z_{neg}$)    /\* grads from eq 9 \*/ <br><br> $\|\ \frac{\partial \mathcal{L}}{\partial W} \leftarrow Z_{pos} \cdot Z_{pos}^T - Z_{neg} \cdot Z_{neg}^T$ <br><br> $\|\ \frac{\partial \mathcal{L}}{\partial b} \leftarrow (Z_{pos} - Z_{neg}) \cdot 1$ <br><br> $\|\ \frac{\partial \mathcal{L}}{\partial U} \leftarrow e^{-2\alpha} \cdot (X_{pos} - U \cdot Z_{pos} - \mu) \cdot Z_{pos}^T$ |

| Algorithm 3: helper functions for nDBN with orthogonal U |
|---|
| $\|\ \dfrac{\partial \mathcal{L}}{\partial U} \leftarrow e^{-2\alpha} \cdot (X_{pos} - U \cdot Z_{pos} - \mu) \cdot 1$ |
| $\|\ \dfrac{\partial \mathcal{L}}{\partial \alpha} \leftarrow e^{-2\alpha} \cdot 1^T \cdot [(X_{pos} - U \cdot Z_{pos} - \mu) \odot (X_{pos} - U \cdot Z_{pos} - \mu)] \cdot 1 - m$ |
| def projectParameters ( )   /* project parameters back to $U^T U$ */<br>$\|\ U \leftarrow U \cdot (U^T U)^{-1/2}$ |

Algorithm 3 comprises a helper function for fetching a mini-batch of samples. A mini-batch is a subset of the training dataset. In addition, algorithm 3 comprises a helper function for sampling from a specified distribution, a helper function to sample in the positive phase (see above) and a helper function to sample in the negative phase. Also, algorithm 3 comprises a helper function to compute the gradients and a helper function to project the parameters back to $U^T U$.

Non-Gaussian qDBNs

As described above, the conditional distribution p(x|z) can be a Gaussian distribution. Alternatively, a more general, non-Gaussian, conditional distribution p(x|z) can be used, including a discrete distribution.

Algorithm 4 is an exemplary pseudocode describing an example implementation of a training procedure for a qDBN. In the example illustrated in algorithm 4, the qDBN has unconstrained U.

| Algorithm 4: Helper functions for qDBN with unconstrained U |
|---|
| def getMinibatch (X, m)   /* elements of minibatch repeated r times */<br>$\|\ k \leftarrow k + 1$<br>$\|\ X_{pos} \leftarrow X\ [:,\ k \cdot (m/r) : (k + 1) \cdot (m/r)]$<br>$\|\ X_{pos} \leftarrow$ np.repeat($X_{pos}$, repeats=r, axis=1)   /* repeat in blocks */<br>def samplesGeneric ($Z_{prev}$, $W_g$, $b_g$)   /* sample from specified dist */<br>$\|$ if using CD then<br>$\|\ \|\ p(Z = 1) \leftarrow$ logistic ($b_g$)   /* assumes W = 0 for init */<br>$\|$ else if using PCD then<br>$\|\ \|\ Z$ initialized to result of last call to $Z_{prev}$<br>$\|$ end<br>$\|$ for i ← 1 : n do<br>$\|\ \|$ sample "left" half from $p\left(Z\left[1:\dfrac{d}{2},\ :\right] = 1\right) =$ logistic $\left(W_g \cdot Z\left[\dfrac{d}{2}:,\ :\right] + b_g\left[1:\dfrac{d}{2}\right]\right)$<br>$\|\ \|$ sample "right" half from $p\left(Z\left[\dfrac{d}{2}:,\ :\right] = 1\right) =$ logistic $\left(W_g^T \cdot Z\left[1:\dfrac{d}{2},\ :\right] + b_g\left[\dfrac{d}{2}:\right]\right)$<br>$\|$ end<br>$\|\ X_{neg} \leftarrow \emptyset$<br>$\|$ return Z<br>def posSamples ($X_{pos}$)   /* sample from dist of eq 17 */<br>$\|\ \beta \leftarrow b + \dfrac{e^{-2\alpha}}{2} \cdot [2U^T(x - \mu) - 1]$<br>$\|\ Z_{pos} \leftarrow$ sampleGeneric ($Z_{pos}$, W, β)   /* use CD for init */<br>def negSamples ($Z_{prev}$)   /* sample from dist of eq 16 */<br>$\|\ Z_{neg} \leftarrow$ sampleGeneric ($Z_{neg}$, W, b)<br>def calcScaledZpos ($Z_{pos}$)           /* grad scaling from eq 19 */<br>$\|\ E_{diff} \leftarrow \dfrac{e^{-2\alpha}}{2} \cdot 1^T \cdot (Z_{pos} \odot (Z_{pos} - U^T \cdot U \cdot Z_{pos}))$<br>$\|\ E_{diff\text{-}mean} \leftarrow$ np.repeat($E_{diff}$, reshape((-1, r)).mean(axis = 1), r)<br>$\|\ Z_{pos} \leftarrow [1 + E_{diff} - E_{diff\text{-}mean}] \odot Z_{pos}$   /* broadcast over rows */<br>$\|\ Z_{pos\text{-}d} \leftarrow [1 + E_{diff} - E_{diff\text{-}mean}] \odot Z_{pos}$<br>def calcGradients ($X_{pos}$, $Z_{pos}$, $X_{neg}$, $Z_{neg}$)   /* grads from eqs 12 and 19 */<br>$\|$ calScaledZpos ($Z_{pos}$)<br>$\|\ \dfrac{\partial \mathcal{L}}{\partial W} \leftarrow (Z_{pos}) \cdot Z_{pos}^T - Z_{neg} \cdot Z_{neg}^T$<br>$\|\ \dfrac{\partial \mathcal{L}}{\partial b} \leftarrow (Z_{pos} - Z_{neg}) \cdot 1$ |

Algorithm 4: Helper functions for qDBN with unconstrained U $\frac{\partial \mathcal{L}}{\partial U} \leftarrow e^{-2\alpha} \cdot [(X_{pos} - \mu) \cdot Z_{pos}^T - (U \cdot Z_{pos}) \cdot Z_{pos}^T]$ $\frac{\partial \mathcal{L}}{\partial \mu} \leftarrow e^{-2\alpha} \cdot (X_{pos} - U \cdot Z_{pos} - \mu) \cdot 1$ $\frac{\partial \mathcal{L}}{\partial \alpha} \leftarrow e^{-2\alpha} \cdot 1^T \cdot [(X_{pos} - U \cdot Z_{pos} - \mu) \odot (X_{pos} - U \cdot Z_{pos} - \mu)] \cdot 1 - m +$
$e^{-2\alpha} \cdot 1^T \cdot [-(2 \cdot U^T \cdot (X_{pos} - \mu) + Z_{pos}) \odot Z_{pos-d}] \cdot 1$ def projectParameters ( )
| Parameters are unconstrained Lines Algorithm 4 comprises a helper function for fetching a mini-batch of samples. A mini-batch is a subset of the training dataset. In addition, algorithm 4 comprises a helper function for sampling from a specified distribution, a helper function to sample in the positive phase (see above) and a helper function to sample in the negative phase. Also algorithm 4 comprises a helper function to do scaling of the samples from positive phase, a helper function to compute the gradients and a helper function to project the parameters. The parameters are unconstrained in this example.

Algorithm 5: Helper functions for deep qDBN def getMinibatch (X, m)   /* elements of minibatch repeated r times */
| k ← k + 1
| $X_{pos}$ ← X [:, k · (m/r) : (k + 1) · (m/r)]
| $X_{pos}$ ← np.repeat($X_{pos}$, repeats=r, axis=1)   /* repeat in blocks */
def samplesGeneric ($Z_{prev}$, $W_g$, $b_g$)   /* sample from specified dist */
| if using CD then
| | p(Z = 1) ← logistic ($b_g$)   /* assumes W = 0 for init */
| else if using PCD then
| | Z initialized to result of last call to $Z_{prev}$
| end
| for i ← 1 : n do

| | sample "left" half from $p\left(Z\left[1:\frac{d}{2}, :\right] = 1\right) = \text{logistic}\left(W_g \cdot Z\left[\frac{d}{2}:, :\right] + b_g\left[1:\frac{d}{2}\right]\right)$

| | sample "right" half from $p\left(Z\left[\frac{d}{2}:, :\right] = 1\right) = \text{logistic}\left(W_g^T \cdot Z\left[1:\frac{d}{2}, :\right] + b_g\left[\frac{d}{2}:\right]\right)$

| end
| $X_{neg}$ ← ∅
| return Z
def posSamples ($X_{pos}$)              /* sample from dist of eq 21 */
| $Z_{pos}$ ← logistic (g(x))
def negSamples ($Z_{prev}$)             /* sample from dist of eq 16 */
| $Z_{neg}$ ← sampleGeneric ($Z_{neg}$, W, b)
def calcScaledZpos ($Z_{pos}$)   /* grad scaling from eqs 15 and 22 */
| $E_{diff}$ ←

| $1^T \cdot \left(-\frac{e^{-2\alpha}}{2} \cdot [f(Z_{pos}) - 2 \cdot X_{pos}] \odot f(Z_{pos}) + [W \cdot Z_{pos} - g(X_{pos})] \odot Z_{pos}\right) + b^T \cdot Z_{pos}$

| $E_{diff\text{-}mean}$ ← np.repeat($E_{diff}$.reshape((-1, r)).mean(axis = 1), r)
| $Z_{pos\text{-}d}$ ← [$E_{diff}$ − $E_{diff\text{-}mean}$] ⊙ $Z_{pos}$   /* broadcast over rows */
def calcGradients ($X_{pos}$, $Z_{pos}$, $X_{neg}$, $Z_{neg}$)   /* grads from eqs 12 and 15 */
| calcScaledZpos ($Z_{pos}$)

| $\frac{\partial \mathcal{L}}{\partial W} \leftarrow (Z_{pos}) \cdot Z_{pos}^T - Z_{neg} \cdot Z_{neg}^T$

| $\frac{\partial \mathcal{L}}{\partial b} \leftarrow (Z_{pos} - Z_{neg}) \cdot 1$

| $\frac{\partial \mathcal{L}}{\partial f(Z_{pos})} \leftarrow e^{-2\alpha} \cdot [X_{pos} - f(Z_{pos})]$ /* not marginalized over minibatch */

-continued

Algorithm 5: Helper functions for deep qDBN

| $\frac{\partial \mathcal{L}}{\partial g(X_{pos})} \leftarrow Z_{pos-d}$ /* returns a matrix; use for backprop */

| $\frac{\partial \mathcal{L}}{\partial \alpha} \leftarrow e^{-2\alpha} \cdot 1^T \cdot [(X_{pos} - f(Z_{pos})) \odot (X_{pos} - f(Z_{pos}))] \cdot 1 - m$ def projectParameters ( )
| Parameters are unconstrained Algorithm 5 is an exemplary pseudocode describing an example implementation of a training procedure for a deep qDBN.

Algorithm 5 comprises a helper function for fetching a mini-batch of samples. A mini-batch is a subset of the training dataset. In addition, algorithm 5 comprises a helper function for sampling from a specified distribution, a helper function to sample in the positive phase (see above) and a helper function to sample in the negative phase. Also algorithm 5 comprises a helper function to do scaling of the samples from positive phase, a helper function to compute the gradients and a helper function to project the parameters. The parameters are unconstrained in this example.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet including: U.S. patent application publication 2015/0006443 published Jan. 1, 2015; U.S. patent application publication 2015/0161524 published Jun. 11, 2015; International patent application US2015/046393, filed Aug. 22, 2014; U.S. provisional patent application Ser. No. 62/206,974, filed Aug. 19, 2015; U.S. provisional patent application Ser. No. 62/268,321, filed Dec. 16, 2015; U.S. provisional patent application Ser. No. 62/307,929, filed Mar. 14, 2016; and U.S. provisional patent application Ser. No. 62/207,057, filed Aug. 19, 2015, each of which is incorporated herein by reference in its entirety. Aspects of the embodiments can be modified, if necessary, to employ systems, circuits, and concepts of the various patents, applications, and publications to provide yet further embodiments.

The invention claimed is:

1. A method of operation of a system, the system including a digital computer and an analog computer, the analog computer comprising at least one quantum processor comprising a plurality of qubits, the method comprising:
   operating the at least one quantum processor as a sample generator to provide a plurality of samples from a probability distribution, wherein a shape of the probability distribution depends on a configuration of a number of programmable parameters for the at least one quantum processor, and wherein operating the at least one quantum processor as a sample generator comprises:
      programming the at least one quantum processor with a configuration of the number of programmable parameters for the at least one quantum processor, wherein the configuration of a number of programmable parameters corresponds to the probability distribution over the plurality of qubits of the at least one quantum processor,
      evolving the at least one quantum processor,
      successively reading out states for the qubits in the plurality of qubits of the at least one quantum processor, wherein the states for the qubits in the plurality of qubits correspond to a sample from the probability distribution; and
      updating the plurality of samples to include each of the samples from the probability distribution;
   receiving by the digital computer the plurality of samples generated by the analog computer; and
   performing machine learning by the digital computer using at least one of the samples generated by the analog computer.

2. The method of operation of claim 1 wherein performing machine learning by the digital computer includes performing machine learning via a restricted Boltzmann machine (RBM).

3. The method of operation of claim 1 wherein the digital computer comprises a plurality of graphical processing units (GPUs), and performing machine learning by the digital computer includes operating the GPUs in a feedforward neural network.

4. The method of operation of claim 3, further comprising:
   natively performing RBM sampling via the at least one quantum processor to generate the plurality of samples.

5. The method of operation of claim 1 further comprising:
   receiving a problem having associated therewith a number of problem values; and
   wherein performing machine learning by the digital computer using at least one of the samples generated by the analog computer comprises performing machine learning to generate a mapping between the number of problem values associated with the problem and a number of qubits associated with the analog computer.

6. The method of operation of claim 5 wherein performing machine learning to generate a mapping between the number of problem values and a number of qubits includes performing machine learning to generate a mapping between a plurality of input values and a plurality of qubits.

7. The method of operation of claim 5 wherein performing machine learning to generate a mapping between the number of problem values and a number of qubits includes performing machine learning to generate a mapping between a plurality of output values and a plurality of qubits.

8. The method of operation of claim 5 wherein performing machine learning to generate a mapping between the number of problem values and a number of qubits includes performing machine learning to generate a number of lateral connections between at least one of branches or leaves in a tree representation of the problem.

9. The method of operation of claim 1, further comprising performing one or more post-processing operations by the digital computer on at least one of the samples generated by the analog computer, the one or more post-processing operations at least partially overlapped in time with operating the at least one quantum processor as a sample generator.

10. A computational system, comprising:
  at least one digital computer in communication with an analog computer, the analog computer comprising at least one quantum processor comprising a plurality of qubits; and
  at least one nontransitory processor-readable storage medium that stores at least one of processor-executable instructions or data which, when executed by the at least one processor, cause the at least processor to:
  operate the at least one quantum processor as a sample generator to provide a plurality of samples from a probability distribution, wherein a shape of the probability distribution depends on a configuration of a number of programmable parameters for the at least one quantum processor, and wherein causing the digital computer to operate the at least one quantum processor as a sample generator comprises causing the digital computer to:
    program the at least one quantum processor with a configuration of the number of programmable parameters for the at least one quantum processor, wherein the configuration of a number of programmable parameters corresponds to the probability distribution over the plurality of qubits of the at least one quantum processor,
    evolve the at least one quantum processor,
    successively read out states for the qubits in the plurality of qubits of the at least one quantum processor, wherein the states for the qubits in the plurality of qubits correspond to a sample from the probability distribution; and
    update the plurality of samples to include each of the samples from the probability distribution;
  receive the plurality of samples generated by the analog computer; and
  perform machine learning using at least one of the samples generated by the analog computer.

11. The computational system of claim 10 wherein performing machine learning includes performing machine learning via a restricted Boltzmann machine (RBM).

12. The computational system of claim 10 wherein the digital computer comprises a plurality of graphical processing units (GPUs), and performing machine learning by the digital computer includes operating the GPUs in a feedforward neural network.

13. The computational system of claim 12 wherein the instructions or data, when executed by the digital computer, further cause the digital computer to:
  instruct the quantum processor to natively perform RBM sampling to generate the plurality of samples.

14. The computational system of claim 10 wherein the instructions or data, when executed by the digital processor, further cause the digital processor to perform one or more post-processing operations on at least one of the samples generated by the analog computer, the one or more post-processing operations at least partially overlapped in time with operating the at least one quantum processor as a sample generator.

* * * * *